United States Patent
Tata et al.

(10) Patent No.: US 11,032,679 B2
(45) Date of Patent: *Jun. 8, 2021

(54) ADAPTIVE MULTI-TENANT MONITORING IN RESOURCE CONSTRAINED ENVIRONMENTS

(71) Applicant: International Business Machines Corporation, Armonk, NY (US)

(72) Inventors: Samir Tata, Cupertino, CA (US); Mohamed Mohamed, San Jose, CA (US); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/572,765

(22) Filed: Sep. 17, 2019

(65) Prior Publication Data
US 2020/0029187 A1    Jan. 23, 2020

Related U.S. Application Data

(63) Continuation of application No. 15/700,043, filed on Sep. 8, 2017, now Pat. No. 10,555,142.

(51) Int. Cl.
*G06F 15/173* (2006.01)
*H04W 4/38* (2018.01)
(Continued)

(52) U.S. Cl.
CPC .............. *H04W 4/38* (2018.02); *G06N 7/005* (2013.01); *H04L 43/08* (2013.01); *H04L 67/12* (2013.01)

(58) Field of Classification Search
None
See application file for complete search history.

(56) References Cited

U.S. PATENT DOCUMENTS 8,108,235 B2    1/2012  Chowdhary
8,600,915 B2   12/2013  Thompson
(Continued)

FOREIGN PATENT DOCUMENTS

EP    2874064 A1    5/2015

OTHER PUBLICATIONS

Akbar et al., "Predicting Complex Events for Pro-Active IoT Applications," 2015 IEEE 2nd World Forum on Internet of Things (WF-IoT), pp. 327-332, IEEE, 2015.
(Continued)

*Primary Examiner* — Phuoc H Nguyen
(74) *Attorney, Agent, or Firm* — Jay Wahlquist

(57) ABSTRACT

An example method for multi-tenant adaptive monitoring comprises detecting occurrence of a trigger event and modifying a selection of metrics included in a plurality of monitored metrics that are monitored using available resources of a plurality of tenants. The method further comprises assigning a respective monitoring frequency for each metric; computing respective weights for each metric in the modified selection of metrics; performing a feasibility check to find a solution to a mathematical model for monitoring the modified selection of metrics at the respective assigned monitoring frequency for each metric; and, in response to determining that a solution to the mathematical model cannot be found, adjusting the respective monitoring frequency for one or more metrics. The method further comprises, in response to finding a first solution to the mathematical model, allocating processing associated with monitoring each metric among the available resources of the plurality of tenants.

20 Claims, 7 Drawing Sheets

(51) Int. Cl.
    *G06N 7/00*    (2006.01)
    *H04L 12/26*   (2006.01)
    *H04L 29/08*   (2006.01)

(56) References Cited

U.S. PATENT DOCUMENTS

| | | |
|---|---|---|
| 8,635,328 B2 | 1/2014 | Corley |
| 9,135,135 B2 | 9/2015 | Rao |
| 9,235,556 B2 | 1/2016 | Yaakov |
| 9,317,387 B2 | 4/2016 | Kariv |
| 9,378,111 B2 | 6/2016 | Ramesh Coimbatore |
| 9,405,593 B2 | 8/2016 | McGrath |
| 9,483,392 B1 | 11/2016 | Chirgwin |
| 9,501,330 B2 | 11/2016 | McGrath |
| 9,628,340 B2 | 4/2017 | Blair |
| 10,235,263 B2 | 3/2019 | Megahed |
| 2009/0262656 A1 | 10/2009 | Branson |
| 2010/0077449 A1 | 3/2010 | Kwok |
| 2011/0088022 A1 | 4/2011 | Kruglick |
| 2012/0054331 A1 | 3/2012 | Dagan |
| 2012/0239739 A1 | 9/2012 | Manglik |
| 2013/0173803 A1 | 7/2013 | Pijewski |
| 2013/0290539 A1 | 10/2013 | Kodialam |
| 2014/0133453 A1 | 5/2014 | Maciel |
| 2015/0124612 A1 | 5/2015 | Schlansker |
| 2015/0286507 A1 | 10/2015 | Elmroth |
| 2016/0196527 A1 | 7/2016 | Bose |
| 2017/0046374 A1* | 2/2017 | Fletcher ............... G06F 3/0482 |
| 2017/0106144 A1 | 4/2017 | Kasamanian |
| 2017/0168914 A1 | 6/2017 | Altman |
| 2018/0006888 A1 | 1/2018 | Vaughn |
| 2019/0082286 A1 | 3/2019 | Tata |
| 2019/0095478 A1* | 3/2019 | Tankersley .......... G06F 16/2379 |
| 2019/0196929 A1 | 6/2019 | Megahed |
| 2019/0363968 A1 | 11/2019 | Megahed |

OTHER PUBLICATIONS

Bousdekis et al., "A Probabilistic Model for Context-Aware Proactive Decision Making," 2016 7th International Conference on Information, Intelligence, Systems & Applications (IISA), pp. 1-6, IEEE, 2016.

Engel et al., "A Basic Model for Proactive Event-Driven Computing," Proceedings of the 6th ACM International Conference on Distributed Event-Based Systems, pp. 107-118, ACM, 2012.

List of IBM Patents and Patent Applications Treated as Related, Apr. 3, 2020. 2 pages.

Tata et al., "An Optimization Approach for Adaptive Monitoring in IoT Environments," 2017 IEEE 14th International Conference on Services Computing, pp. 378-385, IEEE, 2017.

Zhu et al., "Predictive Analytics by using Bayesian Model Averaging for Large-Scale Internet of Things," International Journal of Distributed Sensor Networks 9, No. 12 (2013): 723260.

Doraisamy et al., "Metric Based Software Project Performance Monitoring Model", 2015 IEEE Conference on Open Systems (ICOS), Aug. 24-26, 2015, Melaka, Malaysia, pp. 12-17.

Geng et al., "DAML: Domain Adaptation Metric Learning", IEEE Transactions on Image Processing, vol. 20, No. 10, Oct. 2011, pp. 2980-2989.

IBM, "Method to manage reservation and allocation of scarce resources shared by tenants in a massively multi-tenant environment", IP.com Prior Art Database Technical Disclosure, Oct. 12, 2009. IP.com No. IPCOM000188508D. 7 pages.

Jeswani, et al, "Adaptive Monitoring: A Framework to Adapt Passive Monitoring using Probing", 2012 8th International Conference on Network and Service Management (CNSM 2012): Mini-Conference. 7 pages.

List of IBM Patents and Patent Applications Treated as Related, dated Sep. 16, 2019. 2 pages.

Mell et al., "The NIST Definition of Cloud Computing", National Institute of Standards and Technology, Special Publication 800-145. Sep. 2011. 7 pages.

Munawar, et al., "Adaptive Monitoring with Dynamic Differential Tracing-based Diagnosis", DSOM 2008, LNCS 5273. 14 pages.

Rimal, "Workflow Scheduling in Multi-Tenant Cloud Computing Environments", IEEE Transactions on Parallel and Distributed Systems, vol. 28, No. 1, Jan. 2017. 15 pages.

Trinihas, et al., "AdaM: an Adaptive Monitoring Framework for Sampling and Filtering on IoT Devices", 2015 IEEE International Conference on Big Data. 10 pages.

\* cited by examiner

ADAPTIVE MULTI-TENANT MONITORING IN RESOURCE CONSTRAINED ENVIRONMENTS

BACKGROUND

Computer systems monitor various metrics, e.g. physical properties, utilizing various sensors and devices. A sensor is a device that detects or measures a property, and records, indicates, transmits, or responds to the detection or measurement. A metric can be weather related (e.g. temperature and humidity), health related (e.g. blood pressure and heart beat), transportation related (traffics accidents and traffic jams), or other types of metrics. Various sensor configurations may be employed to measure different metrics.

Sensors and associated sensor data related to the metrics are often employed in systems to support the operation of one or more physical devices. For example, physical devices often operate more effectively when supported by the appropriate metrics and appropriate frequency of receipt of sensor data correlated to the metrics. An active sensor can monitor one or more metrics and produce a metric value, e.g. data, to transmit to a hardware device or software. A hardware or software device utilizes one or more system resources when determining and processing a metric value. Hardware and software used in the requesting, transmitting, and processing of metric values has a finite quantity of available resources to handle the data. Due to the finite quantity of available resources, all metrics cannot be monitored continuously, and as such are subject to selection.

SUMMARY

Aspects of the disclosure may include a computer implemented method, computer program product, computing device and system for multi-tenant adaptive monitoring. An example method includes a computer-implemented method of multi-tenant adaptive monitoring. The method comprises detecting occurrence of a trigger event and modifying, in response to detecting occurrence of the trigger event, a selection of metrics included in a plurality of monitored metrics that are monitored using available resources of a plurality of tenants. Each metric is associated with at least one of the plurality of tenants. The modified selection of metrics includes at least one shared metric associated with at least two or more of the plurality of tenants. The method further comprises assigning a respective monitoring frequency for each metric included in the modified selection of metrics. Assigning the respective monitoring frequency for the at least one shared metric includes computing the respective monitoring frequency as a function of a respective desired monitoring frequency for each of the two more tenants associated with the at least one shared metric. The method further comprises computing respective weights for each metric in the modified selection of metrics; performing a feasibility check to find a solution to a mathematical model for monitoring the modified selection of metrics at the respective assigned monitoring frequency for each metric using the available resources of the plurality of tenants; and, in response to determining that a solution to the mathematical model cannot be found, adjusting the respective monitoring frequency for one or more metrics in the modified selection of metrics based, at least in part, on the respective weight for each metric and on the at least one tenant associated with each metric until a solution to the mathematical model is found. The method further comprises, in response to finding a first solution to the mathematical model, allocating processing associated with monitoring each metric in the modified selection of metrics among the available resources of the plurality of tenants based on the respective monitoring frequency of each metric and based on the at least one tenant associated with each metric.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
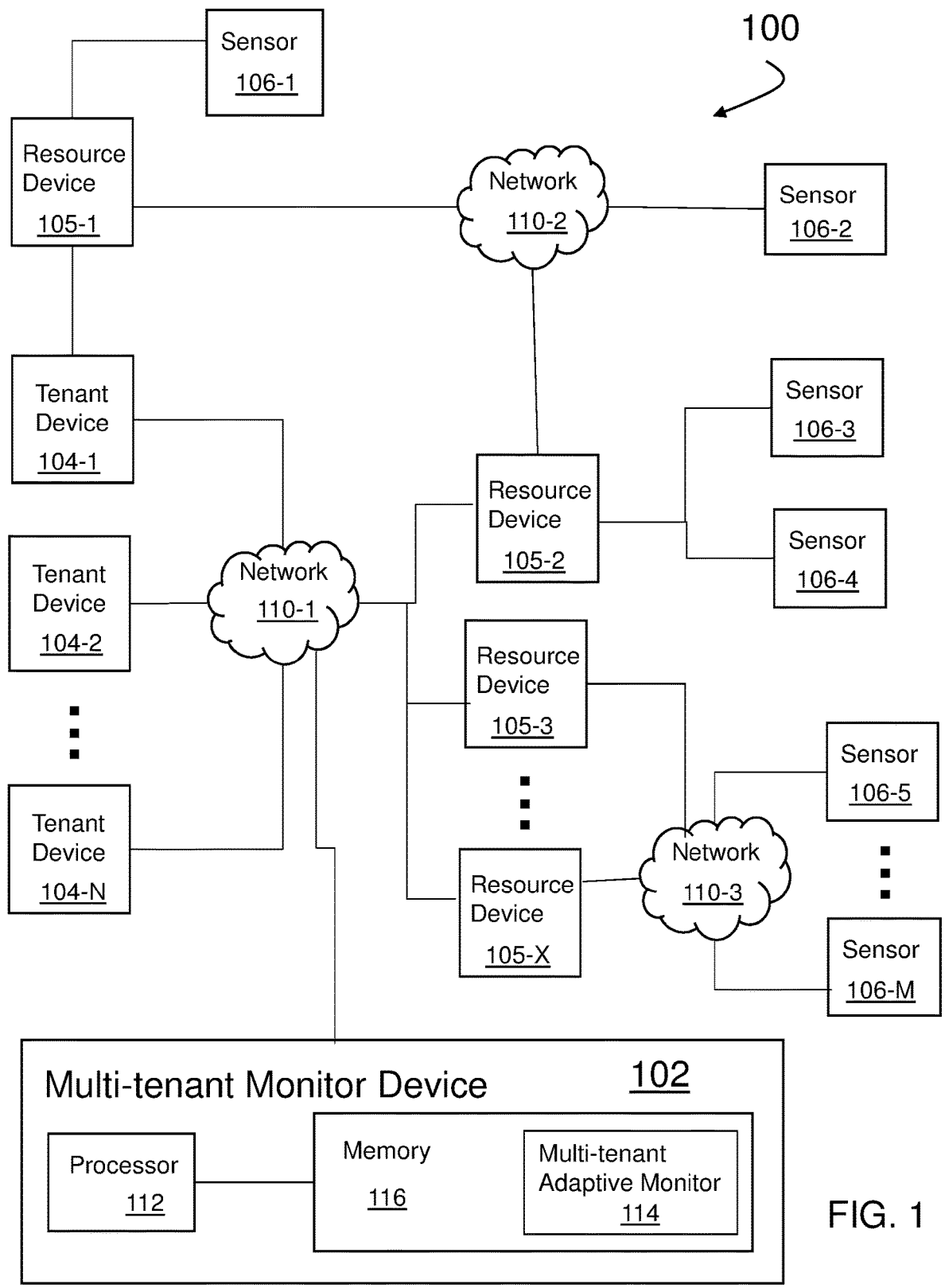
FIG. 1 is a block diagram of one embodiment of an example computer system that supports and enables multi-tenant adaptive monitoring.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Reference throughout this specification to "a select embodiment," "one embodiment," or "an embodiment" means that a particular feature, structure, or characteristic described in connection with the embodiment is included in at least one embodiment of the present disclosure. Thus, appearances of the phrases "a select embodiment," "in one embodiment," or "in an embodiment" in various places throughout this specification are not necessarily referring to the same embodiment.

In addition, as used herein, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Furthermore, as used herein, the term "tenant" refers to a consumer of data. Thus, a tenant can be a device that needs or otherwise uses certain data. Similarly, a tenant can be an application on a device which uses or consumes data. A tenant can also be an individual or organization which utilizes one or more devices that consume data. Thus, as used herein a "tenant device" is a device which provides an interface with one or more tenants to receive tenant input and provide data to a tenant. Thus, a single tenant device can be shared by more than one tenant or a single tenant device can be dedicated for a single tenant. As used herein, a "resource device" is a device having resources used to monitor one or more metrics.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A sensor is a device that detects or measures a property (e.g. biological, chemical, and physical), and records, indicates, transmits, or responds to the detection or measurement. Various sensor configurations may be employed to measure different properties. It is understood that sensors and associated sensor data correlating to one or more properties may be employed in a system to support one or more physical devices. Examples of such physical devices can include, but are not limited to, smart phones and smart cars. Data gathered from the sensors is reported to the physical devices and/or an application in support of the physical devices. It is noted that the term 'parameter' as described herein is a monitored metric, and a 'condition' (e.g. secondary condition) is an environmental event that occurs.

Software applications can include, but are not limited to, navigation applications, health applications and weather applications. In one embodiment, the sensor data is stored in memory. All systems have a finite capacity with respect to acquiring data and storing data, although some systems may have larger capacity than other systems. For example, the amount of data transmitted through a network is limited by bandwidth. Similarly, the amount of stored data is limited by data storage. Similarly, computer implemented systems that may be employed for processing the sensor data have limitations related to system processing resources. Comparably, portable devices have limited battery power.

In a multi-tenant environment, each of the plurality of tenants (e.g. devices, applications) can each request one or more monitored metrics. The monitored metrics requested by each tenant can overlap with the monitored metrics requested by one or more of the other tenants. Thus, the plurality of tenants in the multi-tenant environment have different resource needs and there is a finite number of resources to meet those different resource needs. Thus, the challenge of selecting sensors and properties to measure in order to improve and/or optimize the utilization of those finite resources is complicated by the varying resource needs of a plurality of tenants. For example, two different tenants may need resources to measure two different parameters or metrics. Additionally, even when two or more tenants seek to use resources for the same parameter, the desired frequency at which the parameter is measured may be different for each of those tenants. The embodiments described herein enable automatic adaptive monitoring in a resource constrained multi-tenant environment. For example, the embodiments enable improved performance by adaptively selecting parameters, sensors, frequencies of measurement, etc. to balance the finite resources to meet the disparate resource needs of each of the different tenants.

As used herein, monitoring a metric determines a value for a property (e.g. chemical, biological, and physical). Different types of schemes can be used. For example, one monitoring scheme is referred to herein as periodic-based monitoring. In periodic-based monitoring, the monitoring happens at regular time periods (e.g., measure the blood pressure once per week, collect the temperature value once per hour, monitor the memory consumption one time per second, etc.) Another type of monitoring scheme is referred to herein as event-based monitoring. In event-based monitoring, the monitoring of certain metrics is done when a certain pre-defined event occurs. For example, a metric for the number of cars stuck in an accident can be monitored whenever an accident event occurs. Similarly, a metric measuring the average speed of vehicles can be monitored when it rains. Thus, the metrics are only monitored in response to a pre-defined event in event-based monitoring.

The embodiments described herein enabled dynamic adaptation of the monitoring of a plurality of metrics to meet changing resource needs of one or more of the plurality of tenants.

For example, different types of events or triggers can initiate the dynamic adjustments. One of the categories or types of triggers are referred to herein as environment-based events or triggers. In environment-based monitoring, embodiments of the multi-tenant system employ or establish a set of rules in response to occurrence of an environmental event to dynamically adjust the metric monitoring. An environmental event is a change in the environment of metrics being monitored which causes or necessitates a change in the metrics being monitored. The change in monitored metrics can include monitoring one or more new metrics, ceasing monitoring of one or more currently monitored metrics, and/or changing the frequency of one or more currently monitored metrics.

For example, in the case of one of the tenants being implemented as a smart automobile performing a navigation task including monitoring a set of metrics of a primary route, the resource needs of the navigation task are dynamically adjusted to monitor metrics of a secondary route in response to determining that the primary route is closed. In one such embodiment, the closed primary route may activate a sensor to measure the speed of vehicles on the secondary route. Other example environment-based events can include, but are not limited to, a weather condition (e.g. a storm), a time of day (e.g. night), a particular location (e.g. a city center), a traffic condition (e.g. automobile accident), a season (e.g. fall), a predefined condition, and a user requested adaptation. In one embodiment, the environmental-based event is an auxiliary condition that is pushed to a physical device. Another example of an environment-based event includes a subject device located in an area where a fire occurs. In such an example, the selection of sensors and frequency at which the selection is monitored can be adapted to address the fire, e.g. activate sensors to measure temperature and carbon dioxide of the environment surrounding the fire.

Another type of event or trigger (also referred to herein as a trigger event) that can initiate the dynamic adjustments is referred to herein as metric-based events or triggers. In metric-based monitoring, embodiments of the multi-tenant system employ or establish a set of rules in response to changes in currently measured properties or metrics to dynamically adjust the metric monitoring. Thus, a metric-based event is an event when a metric being monitored increases above a threshold or decreases below a threshold which causes or necessitates a change in the metrics being monitored. The threshold can be determined a priori in some embodiments. In other embodiments, the threshold can be determined dynamically based on other measured metrics. The change in monitored metrics can include monitoring one or more new metrics, ceasing monitoring of one or more currently monitored metrics, and/or changing the frequency of one or more currently monitored metrics.

One example of a metric-based event is in the case of monitoring temperature of a user. In response to determining that the temperature of the user has exceeded a predetermined threshold, the settings of a sensor for monitoring blood pressure of the user can be changed. For example, monitoring the blood pressure can be initiated in response to the temperature rising above the threshold. Alternatively, if the blood pressure is already monitored at a given period or frequency, such as once per week, the frequency can be increased, such as once per day or hour, in response to determining that the temperature has risen above the threshold. Additionally, once the temperature of the user has decreased below the threshold, the blood pressure monitoring can be ceased or the frequency of monitoring can be decreased. It is to be understood that the examples of environment-based triggers and metric-based triggers discussed above are provided by way of example only and not by way of limitation and that other environment-based triggers and metric-based triggers can be used.

Another type of event or trigger that can initiate the dynamic adjustments is referred to herein as a tenant-preference-based event or trigger. A tenant-preference-based event is an event in which a tenant's preferences for one or more monitored metrics is changes. For example, the frequency of monitoring a metric can be changed. The tenant-preference-based event can be explicit or implicit. For example, an explicit tenant-preference-based event occurs when a tenant explicitly changes the preference for a given metric. This can be done by communicating a change in the preference from the tenant to a multi-tenant monitor device configured to balance the resource needs of the plurality of tenants. The tenant-preference-based event can also be implicit. For example, the multi-tenant monitor device can use a predictive model and historical data of past explicit requests from the tenant or from similar tenants (e.g. tenants with similar attributes) to predict a change in the tenant's preferences.

Throughout the monitoring process, resources are utilized to request data, read data, transmit data, and process data. The resources, utilized in order to measure properties, can be, but are not limited to, network facilities, switches, routers, firewalls, servers, hubs, network access cards, data storage, display space, processing resources, electrical power, and battery life. In some embodiments, the resources have finite capacities which can limit how much data can be transmitted, received or processed during a period of time. In some embodiments, a resource has expandable capacity. However, limiting the resource with expanded capacity to a specific utilization can limit costs of having to expand the capacity of the resource. Accordingly, increasing measurement of properties (quantity or frequency) increases resource utilization.

In a multi-tenant environment, a plurality of physical devices are in communication with one or more sensors deployed in various locations throughout a network. The physical devices utilize the one or more sensors to measure respective metrics in support of a respective task on the physical devices. Examples of the tasks can include, but are not limited to, navigation, and health monitoring. During performance of the tasks, data corresponding to the one or more respective metrics is utilized. The data each of the physical devices can receive and process is limited due to resource constraints.

Each of the physical devices and network have constrained resources which limit the quantity of data that can be transmitted, received, and processed. For example, during a navigation task, including turn-by-turn directions, a route from a starting point to a destination is selected including a rule to minimize time to destination. The navigation task includes monitoring metrics such as traffic flow (e.g. speed, accidents), speed of physical device, and location of the physical device (GPS). The frequency of measurements and any alternative routes that are monitored are limited due to resource constraints of the physical devices or a network in communication with the physical devices.

FIG. 1 depicts a high-level block diagram of one embodiment of an example computer system 100 that supports and enables adaptive multi-tenant metric monitoring. System 100 includes a plurality of tenant devices 104-1 . . . 104-N and a plurality of sensors 106-1 . . . 106-M, where N indicates the total number of tenant devices and M indicates the total number of sensors. Additionally, system 100 includes a plurality of resource devices 105-1 . . . 105-X, where X is the total number of resource devices. As discussed above, a tenant is a consumer of data which can be implemented, for example, as a device or application executing on a device which needs or otherwise uses monitored metric data to perform a task. A tenant device 104 provides an interface between a tenant and resources of one or more resource devices. Thus, a tenant device 104 can include respective physical components, such as, but not limited to, one or more processing units, physical memory or storage device(s), network interfaces, etc. For example, each tenant device 104 can be implemented as one of a laptop computer, a desktop computer, a server computer, a tablet, a smartphone, or other electronic device that is communicatively coupled to a resource device either directly or via a network. It is to be understood that the example types of electronic devices listed above are not to be construed as limiting the types of devices which can be implemented as a tenant device. Additionally, a tenant device can be implemented as a user interface component of a device. For example, in some embodiments, tenant device 104-1 can be a user interface of a computer or smartphone and the dedicated resource device 105-1 coupled to the tenant device 104-1 can be the memory and processor components of the computer or smartphone while the dedicated sensor 106-1 coupled to the resource device 105 can be a sensor of the computer or smartphone, such as a temperature sensor, Global Positioning Sensor (GPS), compass, etc.

Each sensor 106-1 . . . 106-M is configured to obtain data regarding one or more monitored metrics. Example types of sensors include, but are not limited to, heart rate monitors, blood pressure monitors, microphones, photographic cameras, infrared cameras, temperature probes, hydrometers, Global Positioning System (GPS) sensors, Radio Detection And Ranging (RADAR) devices, Light Detection And Ranging (LIDAR) devices, etc. It is to be understood that the type and quantity of sensors will vary in different embodiments according to the specific tasks performed by implementations of the plurality of tenants and that any suitable monitoring device or sensor can be used in various embodiments. It is to be understood that each sensor can be implemented as a different type of monitoring device, in some embodiments, and that in other embodiments, two or more sensors may be implemented as the same type of monitoring device.

Each resource device 105-1 . . . 105-X includes respective physical components, such as, but not limited to, one or more processing units, physical memory or storage device(s), network interfaces, etc. which are used to communicate with respective sensors 106 for monitoring respective metrics. Each resource device 105 and each sensor 106 can be shared or dedicated. For example, resource device 105-1 is dedicated for use by tenant device 104-1. That is, resource device 105-1 is only accessed by tenant device 104-1. Similarly, sensor 106-1 is a dedicated sensor for a resource device 105-1. Thus, a dedicated sensor refers to a sensor that is only accessed by a single resource device a dedicated resource device refers to a resource device that is only accessed by a single tenant device.

Sensors 106-3 and 106-4 are dedicated sensors for resource device 105-2 as they are only accessed by resource device 105-2. However, in this example, resource device 105-2 is a shared resource device as it can be accessed by any of tenant devices 104-1 . . . 104-N via network 110-1. Similarly, resource devices 105-3 . . . 105-X are shared resource devices since they can be accessed by any of tenant devices 104-1 . . . 104-N via network 110-1. Sensor 106-2 is also a shared sensor because it can be accessed by either of resource device 105-1 or resource device 105-2 via a network 110-2. Sensors 106-5 . . . 106-M are shared sensors which can be accessed by any of resource devices 105-3 . . . 105-X via a network 110-Y. Thus, each of the tenant devices 104-1 . . . 104-N can be communicatively coupled to one or more of the resource devices 105-1 . . . 105-X and sensors 106-1 . . . 106-M via different communication paths.

Each of the networks 110-1 . . . 110-Y, where Y is the total number of networks, can be implemented by any number of any suitable communications media (e.g., wide area network (WAN), local area network (LAN), Internet, Intranet, etc.). Furthermore, in some embodiments, networks 110-1 . . . 110-Y are implemented as the same network. Thus, in such embodiments, there is a single network 110. Additionally, one or more tenant devices 104, one or more resource devices 105, and one or more sensors 106 can be local to each other, and communicate via any appropriate local communication medium (e.g., local area network (LAN), hardwire, wireless link, Intranet, etc.). In some embodiments, the networks 110 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

The system 100 also includes a multi-tenant monitor device 102. The multi-tenant monitor device 102 includes a processor 112 in communication with a memory 116. As described in more detail below, the processor 112 is configured to execute multi-tenant adaptive monitor instructions 114 stored on the memory 116 which enable the multi-tenant monitor device 102 to dynamically adapt the monitoring of a plurality of metrics to meet changing resource needs of one or more of the plurality of tenants 104. In particular, the multi-tenant monitor device 102 is configured to assign processing demands for each requested monitored metric among the different resource devices 105 as well as to determine the frequency at which each metric is to be monitored such that the finite resources available from the plurality of resource devices 105 can be utilized to monitor each requested metric without the need to increase available resources. In other words, the multi-tenant monitor device 102 is configured to determine how to assign processing of each of the requested metrics with the available finite resources. In this way, the cost of increasing resources can be avoided while also enabling the system to monitor all of the requested metrics. Although depicted as a separate type of device in the example of FIG. 1, the multi-tenant monitor device 102 can also be implemented as a tenant device or a resource device, in other embodiments.

Each resource device 105 has individual resources, such as local memory storage, central processing unit (CPU) processing cycles, etc. which can be used to monitor metrics. Shared resource devices, such as resource device 105-2, share its resources among different tenant devices 104. For example, values obtained from sensor 106-3 by resource device 105-2 can be stored in memory of resource device 105-2 which can then be accessed by a plurality of tenant devices 104. In this way, the data can be consumed by more than one tenant device 104 without requiring each tenant device to separately monitor and process the data from sensor 106-3. The resources of each resource device 105 can include both physical resources of the respective resource device 105 as well as virtual resources allocated to the respective resource device 105. The multi-tenant monitor device 102 is configured to leverage the resources of the resource devices 105 to monitor the requested metrics without requiring an increase in the finite resources available, as described in more detail below with respect to FIGS. 2-4.

Figure 2:
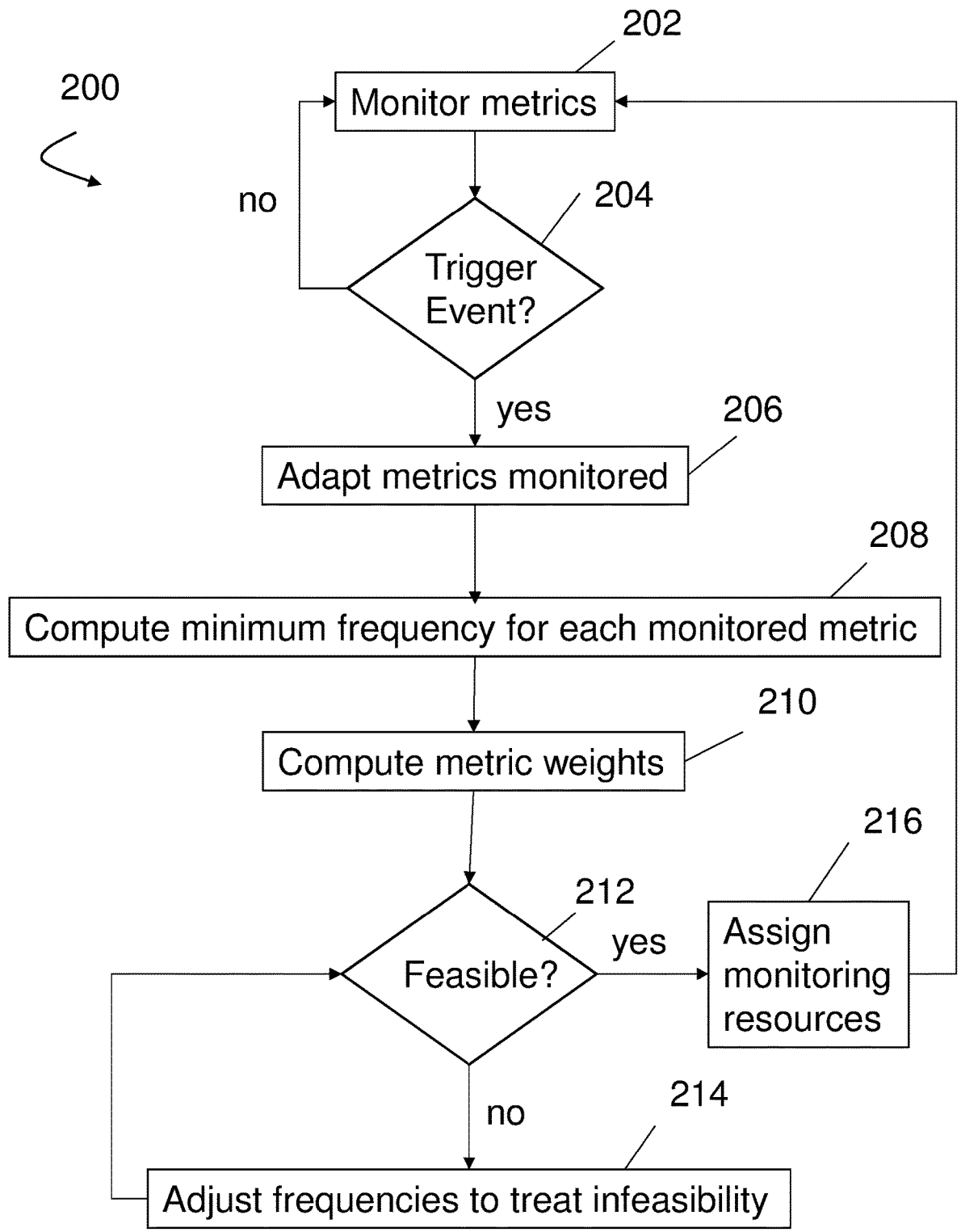
FIG. 2 is a flow chart depicting one embodiment of an example method of multi-tenant adaptive monitoring.

FIG. 2 is a flow chart depicting one embodiment of an example method 200 of multi-tenant adaptive monitoring. Method 200 can be implemented by a processor executing instructions stored in a computer readable storage medium communicatively coupled to the processor. For example, the method 200 can be implemented by the multi-tenant monitor device 102, described above, or the multi-tenant monitor device 502 described below. It is to be understood that the individual acts of method 200 can be implemented in a different order than that described herein and that one or more steps can be omitted or other steps can be included in other embodiments.

At block 202, one or more metrics are monitored in support of one or more tasks on a plurality of tenant devices by utilizing sensors to perform measurements of the metrics. In one embodiment, the metrics are initially chosen based on a rule associated with the respective tasks. The tenant devices can be, but are not limited to, a physical device, a client machine, or a server. Monitoring the metrics includes tenant devices or an application on tenant devices requesting or collecting sensor data related to metric values either at respective intervals or continuously. The aspect of monitoring utilizes available resources in order to process a request of sensor data, transmit the request, the recipient (e.g. sensor) to receive and process the request, the recipient to measure the requested metric, the recipient to transmit a measurement as a response (e.g. sensor data), and a device or software to receive the sensor data, the device or software to process the sensor data, and the device or software to generate a metric value. The quantity of metrics monitored or quantity of sensors subject to the metric measurement vary based on the implementation and metrics involved. Accordingly, one or more metrics are monitored at intervals utilizing available resources.

At block 204, the multi-tenant monitor device determines if a trigger event has occurred. As discussed above, there are multiple possible types of trigger events. For example, the trigger event can be an environment-based event, a tenant-preference-based events, and/or a metric-based event. Depending on the type of trigger event, different processing can be involved. For example, detecting a tenant-preference-based event includes either an implicit determination of the tenant's changed preference or an explicit determination of the tenant's changed preference. As discussed above, an explicit determination involves obtaining the changed preference values from the tenant device and implicit determination involves analyzing past behavior of the tenant or similar tenants to predict the change in the tenant's preference.

Additionally, detecting a metric-based event includes determining whether there is a need to extend monitoring to one or more correlated metrics, in some embodiments. That is, the metric-based event can cause the frequency of the metric being monitored to be changed, but not necessarily require adding or removing additional metrics to be monitored. In such a case, the monitoring does not need to be extended to correlated metrics and the method 200 can omit block 206, in some embodiments. Thus, as discussed above, method 200 can include additional or fewer acts than those discussed shown in FIG. 2.

In some embodiments, a correlation coefficient can be used to determine which metrics to measure and whether the monitoring should be extended to one or more correlated metrics. A correlation coefficient connotes relation of (e.g. dependency of) a metric to another metric and/or a monitoring parameter. Thus, based on the correlation coefficient of the monitored metric associated with the metric-based trigger and the correlation coefficient of one or more other correlated metrics (e.g. metrics which are not being monitored when the metric-based event occurred), the multi-tenant monitor device can determine whether to extend monitoring to the one or more other correlated metrics. For example, the correlation between the metrics and a monitoring parameter can be positive or negative. In some embodiments, the change in value of the monitored metric (e.g. exceeding or dropping below a threshold) can be evaluated using the correlation coefficient to determine whether the monitored metric has a positive or negative correlation with a monitoring parameter. Additionally, the change in value of the monitored metric can be evaluated using the correlation coefficient of the one or more other correlated metrics.

Based on the measured value of the monitored metric and the respective correlation coefficient assigned to the monitored metric and to the one or more other correlated metrics, a respective positive or negative correlation can be determined for each of the metrics. In some embodiments, it is determined to extend monitoring to one or more unmonitored correlated metrics when an unmonitored metric has a positive correlation to the affected monitoring parameter. In some embodiments, it is determined to extend monitoring to one or more unmonitored correlated metrics when the monitored metric has a negative correlation to the affected monitoring parameter based on the measured value of the monitored metric.

For example, in an example health related setting, a patient's body temperature can be monitored. If the measured value of the patient's body temperature exceeds a predetermined threshold, the correlation coefficient of the temperature metric can be evaluated using the measured body temperature value. Additionally, the respective correlation coefficients of other health related metrics, such as blood pressure and pulse for example, can also be evaluated using the measured body temperature value. The respective correlation coefficients can be selected such that when the temperature exceeds the threshold, the temperature metric will have a negative correlation to a monitoring parameter and/or the correlation coefficient of one or more of the other health related metrics can be selected such that one or more of the other health related metric has a positive correlation to the monitoring parameter when the temperature exceeds the threshold. Thus, the coefficients enable the multi-tenant monitor device to determine automatically (e.g. without requiring human input) which metrics to monitor in response to the detected metric-based event, such as by selecting positively correlated metrics for monitoring and not monitoring metrics having a negative correlation. However, it is to be understood that the example discussed above with respect to health monitoring is provided by way of example only is not intended to be limiting.

Additionally, at block 204 a determination is made, in some embodiments involving environment-based events, of whether the environment-based event affects one or more monitoring parameters based on a rule. A monitoring parameter includes, but is not limited to, the selection of metrics that are measured/monitored and the frequency of performing a measurement. In some embodiment, a monitoring parameter is affected when a measured metric value meets or exceeds a threshold, as discussed above. Alternatively, it can be determined that a monitoring parameter is affected when a measured metric value meets or drops below a threshold, as discussed above. A determination that a monitoring parameter is affected can necessitate changing the metrics that are monitored and/or the frequency of measuring the monitored metric, as discussed above. Thus, when an event or trigger is detected that causes a change to the monitored metrics (e.g. an environment-based metric has an impact on monitored metrics, a tenant-preference-based event is detected, or a metric-based event has an impact on the monitored metrics), the method 200 proceeds to block 206. Additionally, in some embodiments, if the event or trigger detected at block 204 only indicates a change in the frequency of monitored metrics, but not the selection of metrics to be monitored, then block 206 can be omitted. If a trigger event has not occurred, the method 200 continues to monitor the one or more metrics at block 202.

At block 206, the selection of metrics to be monitored is adapted or modified. The adaptation of the metrics includes adding an additional metric to be monitored and/or a removal of a metric that is being monitored. Metrics are added and removed based on an adaptation rule including a correlation to the affected monitoring parameter or event trigger. The correlation may be based on a correlation coefficient, as discussed above. Additionally, in some embodiments, a metric can have a dependency on one or more other metrics. A dependency on one or more metrics connotes the metrics are related, thus the metrics should be added or removed as a group. For example, if a metric for monitoring engine temperature and a metric for monitoring Revolutions Per Minute (RPMs) have a dependency indicating that both metrics should be monitored together, then addition of the metric for engine temperature also includes addition of the RPM metric. Similarly, removal of the metric for engine temperature also indicates that the metric for RPM should also be removed unless the RPM metric also has a dependency with another metric being monitored or added for monitoring.

Additionally, in some embodiments, an environment-based event and/or a metric-based event is associated with an adaptation rule that includes a predefined set of metrics that are to be monitored in response to the occurrence of the event. Thus metrics are added and removed based on the predefined set of metrics, in such embodiments. For example, if it is raining, a metric to monitor traffic speed can be added. In another example, if blood pressure was measured over a threshold, a metric to monitor heart rhythm is added. It is to be understood that the examples above are provided for purposes of explanation only and are not to be construed as limiting.

At block 208, a minimum monitoring frequency is assigned for each monitored metric selected at block 206. Assigning the minimum frequency includes assigning to a metric the minimum or desired frequency input by the tenant device requesting the metric if the tenant device is the only tenant device requesting that metric. If more than one tenant request the same metric (i.e. a shared metric), then the multi-tenant monitor device computes the minimum frequency to be assigned to the shared metric based on the respective minimum or desired frequencies input by each tenant device requesting the shared metric. For example, the computed minimum frequency can be an average of the minimum frequencies input by all of the tenant devices requesting the shared metric. In another embodiment, the computed minimum frequency can be a median of the minimum frequencies input by all of the tenant devices requesting the shared metric. In yet another embodiment, the computed minimum frequency can be the maximum frequency of the minimum frequencies input by all of the tenant devices requesting the shared metric. In yet another embodiment, the computed minimum frequency can be the minimum frequency of the minimum frequencies input by all of the tenant devices requesting the shared metric. Thus, the computed minimum frequency for each monitored metric is not necessarily the same as the requested minimum frequency from the plurality of tenants. By not requiring that the requested minimum frequency of all tenants be met, the system is able to more efficiently allocate the finite resources in the resource-constrained environment to monitor all of the requested metrics without requiring additional resources, as described in more detail below.

After computing and assigning respective minimum frequencies to each of the monitored metrics, the multi-tenant monitor device computes metric weights for each of the monitored metrics at block 210. Weights are assigned to the metrics that are currently monitored (and not removed) and any newly added metrics to be monitored by one or more of the plurality of tenant devices. In one embodiment, the assignment of weights is stored in memory. In one embodiment, the assignment of weights is based upon an assignment rule. For example, in some embodiments involving the case of a metric-based event that induces a need to extend the monitoring to correlated metrics, the weight for a newly added correlated metric is a function of the weight of the metric which triggered the event, the weights of other metrics already being monitored that the newly added metric is correlated to, and the correlation coefficient between the metrics. For example, in some embodiments, the weight of the newly added metric is equal to the weight of the metric that triggered the event times the correlation coefficient between the newly added metric and the metric that triggered the event.

In another example, in some embodiments involving the case of an environment-based event, the weight of a newly added metric is a function of the correlation coefficient between the newly added metric and the environment event, the weights of other metrics already being monitored that the newly added metric is correlated to, and the correlation coefficient between the metrics. For example, in some such embodiments, the weight of the newly added metric is equal to the correlation coefficient between the metrics.

In another example, in some embodiments involving a metric-based event which does not induce a need to extend monitoring to any other correlated metrics, new weights of the already monitored metrics are computed as a non-decreasing function of the absolute difference from the monitored metric value and the threshold value.

In another example, in some embodiments involving a tenant-preference-based event, the tenant device provides a weight/importance of the new metric to be added. The multi-tenant monitor device then computes the weight for the new metric as a function of the weight provided by the tenant device, the weights of other metrics already being monitored that are correlated to the newly added metric, and the correlation coefficient between the metrics.

After assigning the computed metric weights to the metrics to be monitored, the multi-tenant monitor device determines at block 212 if there is a feasible solution to monitoring the metrics based on the assigned minimum frequencies and assigned metric weights using the available resources. Stated another way, the multi-tenant monitor device determines at block 212 whether the available resources of the plurality of tenants (i.e. the resources of tenant devices and/or resources of shared and dedicated resource devices) can accommodate monitoring each of the metrics to be monitored at the minimum frequencies computed at block 208. For example, the multi-tenant monitor device can search for a solution to a mathematical model for monitoring the selection of metrics at the respective computed monitoring frequency for each metric using available resources of the plurality of tenants. In some embodiments, the mathematical model is an optimization model.

The mathematical model uses various inputs. Some inputs can include information about the available resources and the capacity of each resource; the resource utilization/requirements for each metric (e.g. how many resources does each metric use of the available resources); and the quotas and metric performances of each tenant (e.g. which metrics to monitor for each tenant along with a desired minimum frequency for monitoring each metric). The above inputs can be received from the respective tenant devices over a network. For example, a user can input the above information via a tenant device which communicates the information to the multi-tenant monitor device. Additional inputs can include correlation coefficients between different metrics and correlation coefficients between environmental parameters and each of the different metrics to be monitored. The correlation coefficients can be calculated by the multi-tenant monitor device based on historical data in some embodiments. In other embodiments, the correlation coefficients can be input by provided by the respective tenant devices along with the respective quotas and metric performance requests. Additional inputs used by the multi-tenant monitor device in the mathematical model can also include the currently monitored metrics and the respective weights (e.g. importance coefficient) of the currently monitored metrics; current environmental context (e.g. the environmental parameters and their corresponding values); and the last read value for each currently monitored metric and the time stamp of when the value was read.

Other inputs used by the mathematical model in some embodiments can also include dependencies between metrics; respective deviation thresholds; and respective value thresholds for corresponding metrics. As used herein, dependency between two metrics means that if one metric is monitored, then the other metric is also monitored. A deviation threshold is the minimum deviation from the previous read value at which the frequency of the corresponding metric should be increased so that the metric is measured more often. In other words, if a current read value for a given metric deviates from the previous read value by more than the deviation threshold, then the frequency of the given metric should be increased. A value threshold is the minimum absolute value of a given metric at which the frequency for that given metric should be increased. In other words, if an individual read value for a given metric exceeds the value threshold then the frequency for the corresponding metric should be increased. The dependencies, deviation thresholds, and value thresholds can be input by a tenant via a tenant device or can be calculated by the multi-tenant monitor device based on historical data. It is to be understood that in some embodiments all of the above inputs are used, whereas in other embodiments only some of the above inputs are used. Furthermore, it is to be understood that other inputs can also be used in lieu of or in addition to those discussed above, in some embodiments.

The following is a discussion of one example model that can be used to determine if there is a feasible solution. In order to compute the frequency of measurement, the variables of the example mathematical model are defined as follows; I represents the set of metrics that are to be monitored. K represents the set of the frequency intervals for measurement, ordered from lowest to the highest interval value. For example, there are different possible frequency intervals at which a metric can be measured (e.g. measured once every 10 ms, or once every 2 minutes). The minimum possible value in set K is the minimum possible measurement interval, $k_{min}$. The maximum possible value in K is the maximum possible measurement interval, $k_{max}$ or $|K|$, where $|K|$ is the cardinality of the set K. The difference between the values of two successive elements of the set K is equal to the minimum given interval value. J is the set of potential times (e.g. time stamp, particular time, particular occurrence) at which the measurement can begin. $|J|$ is the cardinality of the set J, and is equal to $k_{max}$ ($|K|$). Elements of J are ordered and the step size between the elements is chosen such that a minimum precision value of the monitoring is achieved. Accordingly, the set J is defined to ensure that the computed solution will determine measurement intervals and times for one complete cycle of monitoring.

In the computation, the binary variable $X_{ij}$ is 1 if metric, i∈I, is to be monitored at time, j∈J, otherwise the binary variable $X_{ij}$ is 0. The properties of the binary variable $X_{ij}$ are represented in the following equation.

$$X_{ij} \in \{0,1\}, \forall i \in I, \forall j \in J$$

The weight, $w_i$, is the weight for metric, i∈I. The following equation is used to maximize the measurement frequency of the metrics with a linear proportion to the weights of each monitored metric.

$$\max \sum_{i \in I} \sum_{j \in J} w_i * X_{ij}$$

The binary variable $B_{ij}$ is 1 if metric, i∈I, is to start at time, j∈J, otherwise the binary variable $B_{ij}$ is 0. The binary variable $B_{ij}$ is represented by the following equation.

$$B_{ij} \in \{0,1\}, \forall i \in I, \forall j \in J$$

The following equation ensures that each metric begins measurement once during a monitoring time cycle.

$$\text{s.t.} \sum_{j \in J} B_{ij} = 1, \forall i \in I$$

The binary variable $Interval_{ki}$ is 1 if metric, i∈I, is monitored at frequency k∈K, otherwise the binary variable $Interval_{ki}$ is 0. The binary variable $Interval_{ki}$ is represented by the following equation.

$$Interval_{ki} \in \{0,1\}, \forall k \in K, \forall i \in I$$

The following equation ensures each metric is assigned only one interval.

$$\sum_{k \in K} Interval_{ki} = 1, \forall i \in I$$

The relationship between $X_{ij}$ and $B_{ij}$ is represented in the following equation which sets the first monitored time to 1.

$$X_{ij} \geq B_{ij}, \forall i \in I, \forall j \in J$$

The relationship between $X_{ij}$ and $B_{ij}$ is further defined in the following equation which sets all the monitoring before the first measurement for each metric, i∈I, to zero.

$$X_{ij} \leq (1-B_{ij}), \forall l \in \{1, \ldots, j-1\}$$

$X_{ij}$ and $B_{ij}$ ensure that measurement of each metric will begin at a specific chosen time. The following equation ensures that the subsequent measurements are at a similar interval for each metric.

$$\sum_{z \in \{j, \ldots, j+k-1\}} X_{ij} \geq Interval_{ki}, \forall i \in I, \forall j \in J: (j+k-1) \in J, \forall K \in K$$

The set of resources used for the metric monitoring is defined as R. Each resource, r ∈R, has a given capacity, $rcap_{rj}$, at time, j∈J. Each metric, i∈I, utilizes an amount, $ut_{ir}$, of resource, r∈R, when the metric, i∈I, is being monitored at time, j∈J. The following equation ensures that at each time, j∈J, the total resource utilization of each metric, i∈I, monitored is less than or equal to the available resources at that time for each resource, r∈R.

$$\sum_{i \in I} ut_{ir} * X_{ij} \leq rcap_{jr}, \forall j \in J, \forall r \in R$$

Computing the preceding equations finds possible measurement intervals and start times for monitoring each metric at the minimum assigned frequency for one complete monitoring cycle. Thus, the computation can include offsetting the time a metric is measured from the time another metric is measured. The offsetting includes setting the occurrence of the first metric measurement from the occurrence of the second metric measurement. Accordingly, offsetting the metrics will allow both metrics to be measured at separate times thereby increasing the frequency at which each can be monitored while not exceeding available resource capacity. The model also assigns the required amounts of each resource required to monitor each of the metrics to be monitored and distributes these amounts among each tenant's available resources proportionally to each tenant's respective chosen minimum frequency of monitoring that metric. A tenant's resources, as used herein, refers to the resources of a tenant device corresponding to the tenant as well as the resources of dedicated and shared resource devices coupled to the tenant device corresponding to the tenant.

Accordingly, if a tenant did not request monitoring a given metric, then that tenant's minimum frequency of monitoring that given metric is set to zero, which will result in using zero of that tenant's resources for the monitoring of the given metric not requested by that tenant. For example, the resources of a tenant device or a dedicated resource device for that tenant device are not used for monitoring a metric not requested by the corresponding tenant. Similarly, if a metric is requested to be monitored by only one tenant, then the resources used to monitor that metric will be taken solely from the available resources of the tenant which requested the metric be monitored. If two or more tenants each utilize resources of a shared resource device, then the resources of the shared resource device are available for monitoring a given metric even if only one of the two or more tenants requested monitoring the given metric.

In some embodiments, a solution found at block 212 does not need to be an optimal solution. In other words, once a solution is found that can satisfy the minimum assigned frequencies and weights with the available resources, the computation at block 212 is ended, in some embodiments, regardless of whether it is an optimal solution. If no solution is found that will satisfy the assigned frequencies and weights with the available resources, then method 200 proceeds to block 214. For example, in some embodiments, it is determined that a solution cannot be found if a solution is not found within a predetermined time limit.

At block 214, the multi-tenant monitor device adjusts the assigned frequencies based on the tenants which requested each monitored metric and the weights assigned to each metric. One example method of adjusting the assigned frequencies of measurement for each metric is described in more detail below with respect to FIG. 3. After adjusting the assigned frequencies, the multi-tenant monitor device executes the model at block 212 with the updated frequencies. If a solution is still not found, the multi-tenant monitor device adjusts the assigned frequencies again at block 214 and, then executes the model at block 212. This process continues until the multi-tenant monitor device finds a feasible solution.

Once a solution is found at block 212, the multi-tenant monitor device assigns the computed measurement intervals and start times for each monitored metric to the plurality of resource devices and/or tenant devices at block 216. In other words, the multi-tenant monitor device allocates processing associated with monitoring each metric among the plurality of resource devices and/or tenant devices such that each resource device/tenant device will be assigned respective tasks for obtaining and processing values of respective monitored metrics from the set of metrics based on which tenants requested each of the metrics. For example, in some embodiments, the processing associated with a given metric is proportionally distributed among the resources of the tenant devices requesting that metric according to the respective minimum frequency for monitoring that metric that each tenant device requested.

In some embodiments, assigning the computed measurement intervals and start times includes finding a more efficient allocation of resources, if possible. For example, in some embodiments, an optimal solution that represents the most efficient use of the individual and shared resources to monitor all of the requested metrics is found. In some embodiments, this can be done by solving the mathematical model from block 212 using the adjusted frequencies at block 214 to find an optimal solution rather than stopping processing of the model once any solution is found. One example of another method of finding a more efficient solution is discussed in more detail with respect to FIG. 4. Once the computed intervals and start times are assigned to the plurality of tenants, the method 200 returns to block 202 where values of the monitored metrics are received and processed.

Figure 3:
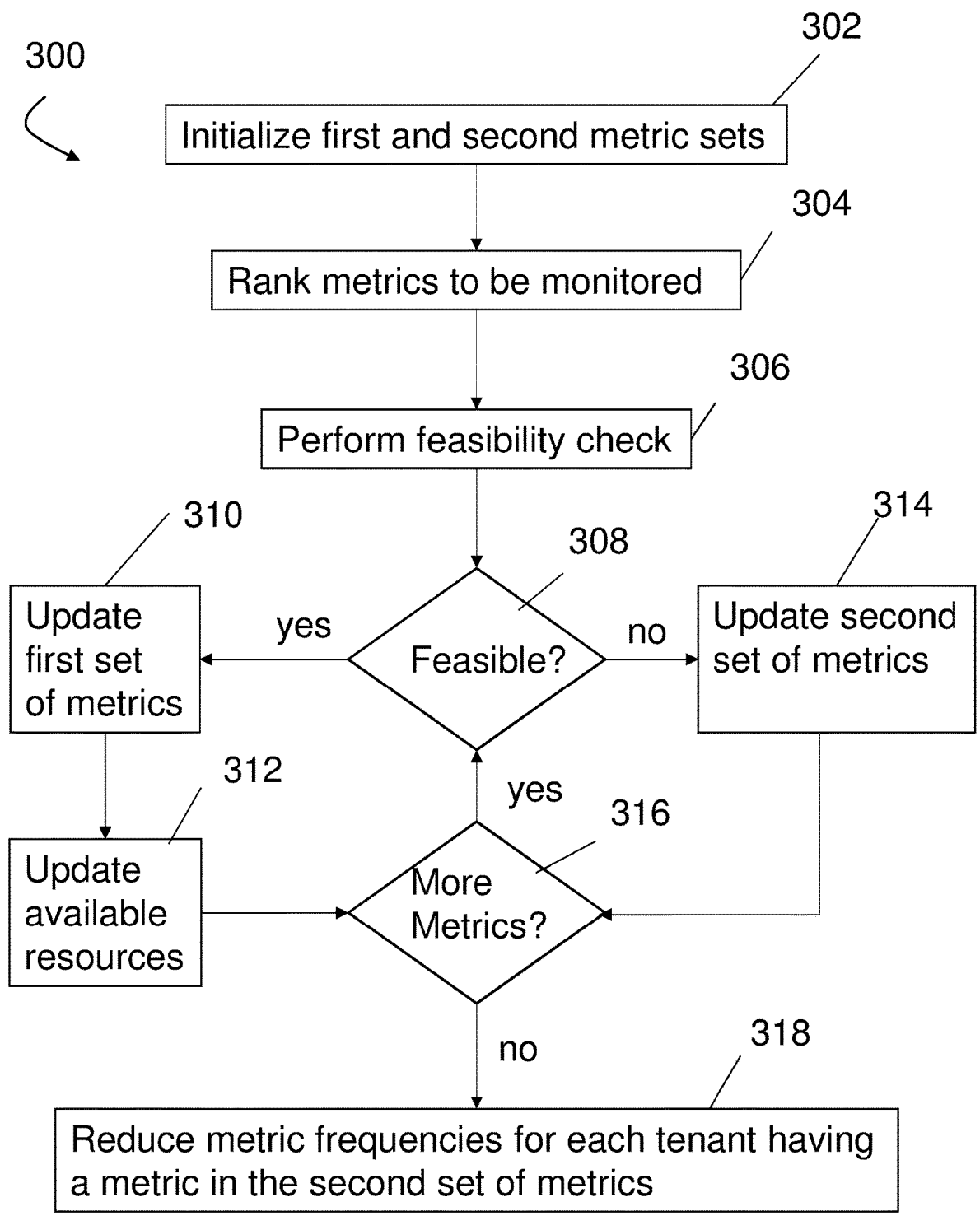
FIG. 3 is a flow chart depicting one embodiment of an example method of adjusting frequencies of measurement.

FIG. 3 is a flow chart depicting one embodiment of an example method 300 of adjusting the assigned frequencies of measurement. Method 300 can be implemented by a processor executing instructions stored in a computer readable storage medium communicatively coupled to the processor. For example, the method 300 can be implemented by the multi-tenant monitor device 102, described above, or the multi-tenant monitor device 502 described below. It is to be understood that the individual acts of method 300 can be implemented in a different order than that described herein and that one or more steps can be omitted or other steps can be included in other embodiments.

At block 302, a first set of metrics, M, and a second set of metrics, N, are initialized as empty. The first set of metrics, M, represents the metrics that can be monitored without adjusting frequencies and the second set of metrics, N, represents the set of metrics that cannot be monitored without adjusting frequencies. In addition, a set of unused resources, R, is initialized to include all the resources of all the plurality of tenants.

At block 304, the metrics selected for monitoring are ranked or sorted in a descending order based on their respective weights. In other words, the metric with the highest respective weight will be first in the sorted list of metrics, followed by the metric with the next highest weight and so on until the metric with the lowest weight is ranked last. The metrics selected for monitoring are those selected at block 206 of FIG. 2 and the respective metric weights are those computed and assigned at block 210 of FIG. 2.

At block 306, the multi-tenant monitor device performs a feasibility check based on the metrics in the first set of metrics, M and adding one metric at a time. For example, the multi-tenant monitor device can use the model discussed with respect to block 212 of FIG. 2. Initially, there are no metrics in the first set of metrics, M, and the first metric having the highest weight is added. If there is a solution found at block 308 to meet the resource needs of the first metric at the assigned frequency, then the first set of metrics, M, is updated to include the first metric, at block 310, and the set of unused resources, R, is updated, at block 312, to be equal to the total available resources less the resources needed to monitor the first metric.

If a solution cannot be found to meet the resources needs at the assigned frequency for the first metric, then the second set of metrics, N, is updated, at block 314, to include the first metric. At block 316, it is determined if there are any additional metrics in the sorted list of metrics. If there are more metrics, the multi-tenant monitor device repeats the process of blocks 308-314 by adding the next metric in the list of metrics sorted at block 304 and using the updated first set of metrics, M, from block 310.

Once it is determined at block 316 that no more metrics remain in the ranked metrics, method 300 proceeds to block 318. At block 318, for each tenant that requested a metric in the second set of metrics, N, the multi-tenant monitor device reduces the assigned minimum frequency of all metrics requested by that tenant. For example, if a first tenant requested two metrics and one of those metrics was placed in the first set of metrics, M, and the other was placed in the second set of metrics, N, the multi-tenant monitor device reduces the respective assigned frequencies for both of the metrics requested by the first tenant. In some embodiments, the multi-tenant monitor device reduces the respective frequencies to a predetermined fraction of the frequencies assigned at block 208 of FIG. 2. For example, the frequencies can be reduced by half, by one third, etc. In other embodiments, each of the frequencies can be reduced to the minimum frequency possible for the given metric. In yet other embodiments, each of the frequencies can be reduced to a user-input bare minimum frequency for each respective metric. After reducing the frequencies of the affected metrics, method 300 and block 212 of FIG. 2 is executed with the adjusted frequencies as discussed above.

Figure 4:
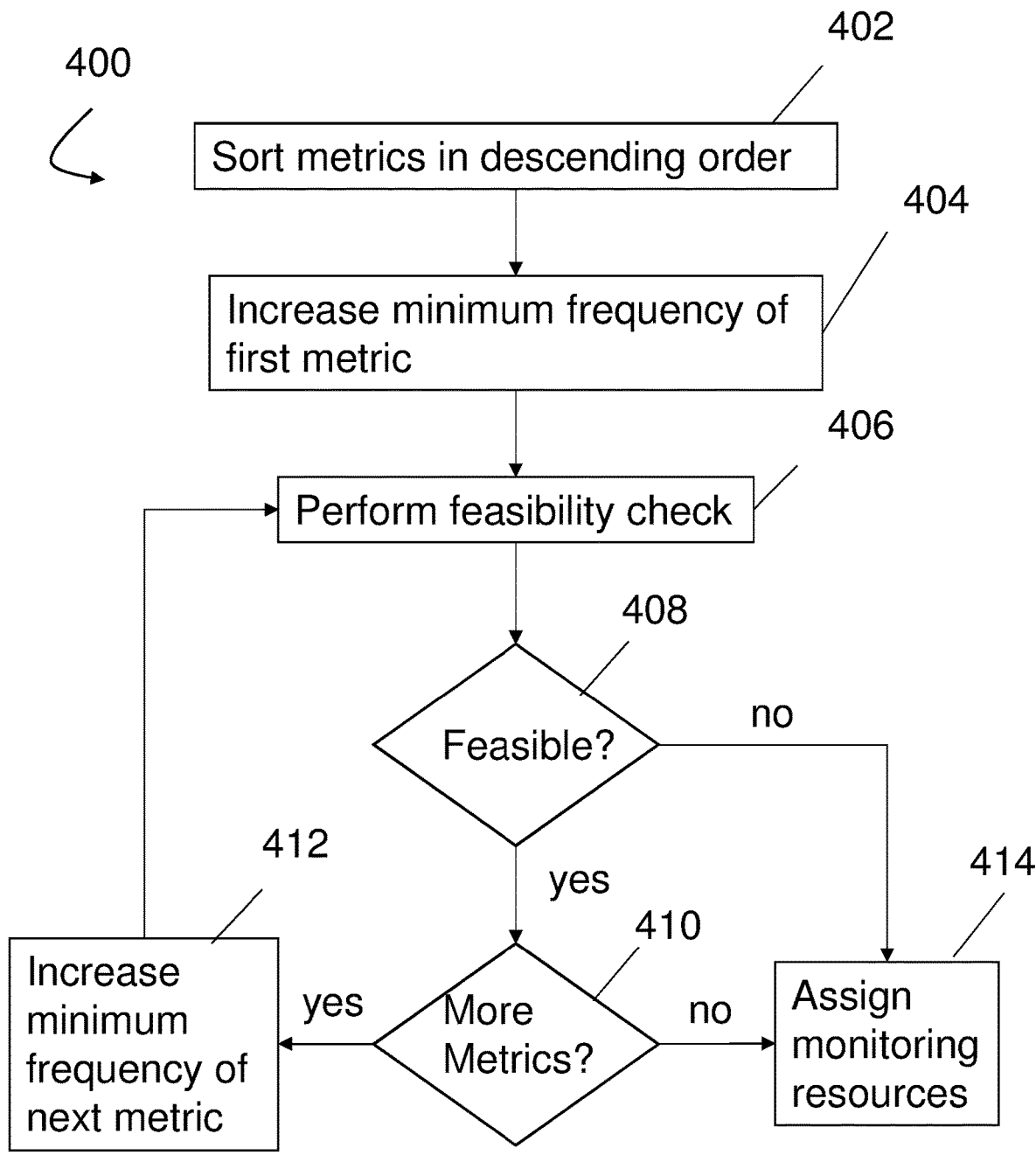
FIG. 4 is a flow chart depicting one embodiment of an example method of finding a more efficient solution for allocation of resources of a plurality of tenants.

FIG. 4 is a flow chart of one embodiment of an example method 400 of finding a more efficient solution for allocation of resources of a plurality of tenants. Method 400 can be implemented by a processor executing instructions stored in a computer readable storage medium communicatively coupled to the processor. For example, the method 400 can be implemented by the multi-tenant monitor device 102, described above, or the multi-tenant monitor device 502 described below. It is to be understood that the individual acts of method 400 can be implemented in a different order than that described herein and that one or more steps can be omitted or other steps can be included in other embodiments.

At 402, the metrics are sorted in descending order according to their weights, similar to the sorting described above with respect to block 304 of FIG. 3. At block 404, the frequency of the first sorted metric is increased. For example, in some embodiments, the frequency is increased by a predetermined increment amount. In other embodiments, the frequency is increased by a predetermined percentage of the frequency assigned to the first sorted metric. At block 406, a feasibility check is performed. The feasibility check is similar to the feasibility check described above with respect to block 212 of FIG. 2. In particular, it is determined if a solution is found to allocate the resources to meet all the assigned frequencies with the increased frequency of the first metric. If a feasible solution is not found, then the frequency of the first metric is reset to its respective value prior to being increased and the multi-tenant monitor device assigns the frequencies and start times to the plurality of tenants, at block 414, as determined by the solution found at block 212 of FIG. 2.

If a feasible solution is found, then it is determined if there are additional metrics in the sorted list of metrics. If there are additional metrics, the multi-tenant monitor device increases the minimum frequency of the next metric in the sorted list, at block 412, and then performs the feasibility check at block 406 using the increased frequency from block 412. This process repeats until there are no more metrics in the list or until a feasible solution cannot be found.

If there are no more metrics in the sorted list, then, in some embodiments, the method 400 proceeds to block 414. In other embodiments, if there are no more metrics, method 400 returns to block 404 and begins the process again by increasing the frequency of the first metric again. This process repeats until a solution cannot be found.

Aspects of the multi-tenant adaptive monitoring, discussed above in FIGS. 1-4, employ one or more functional tools to implement and support use of multi-tenant adaptive monitoring. Aspects of the functional tool, e.g. multi-tenant monitor device, and its associated functionality may be embodied in a computer system/server in a single location, or in one embodiment, may be configured in a cloud based system sharing computing resources.

Figure 5:
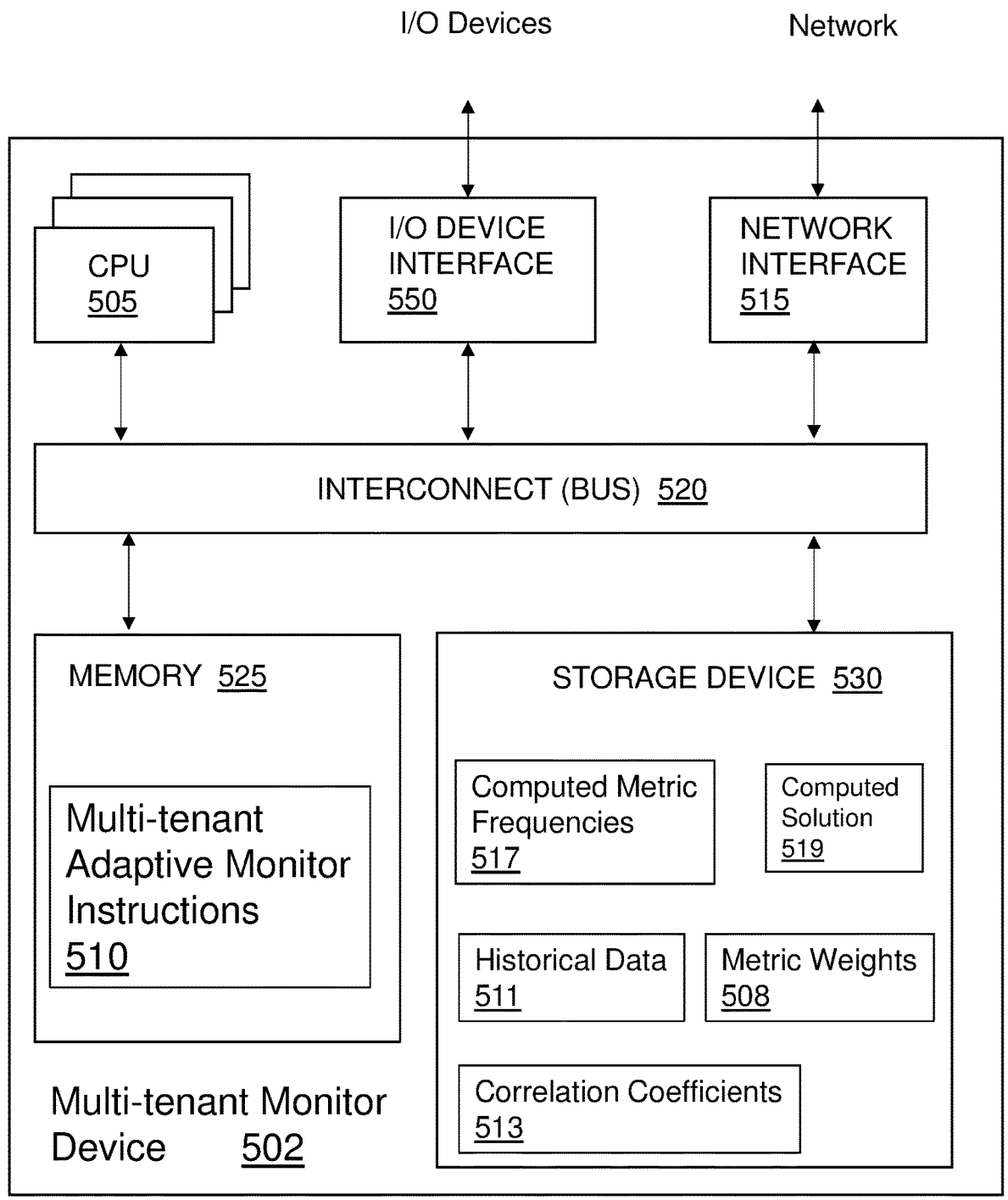
FIG. 5 is a block diagram of one embodiment of an example multi-tenant monitor device.

FIG. 5 is a high level block diagram of one embodiment of an example multi-tenant monitor device 502. The multi-tenant monitor device 502 can be implemented with various different computing systems, environments, and/or configurations. Some example computing systems or environments that can be used in implementing the multi-tenant monitor device 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems and devices.

In the example shown in FIG. 5, the multi-tenant monitor device 502 includes a memory 525, storage 530, an interconnect (e.g., BUS) 520, one or more processors 505 (also referred to as CPU 505 herein), an input/output (I/O) device interface 550, and a network interface 515. Each CPU 505 retrieves and executes programming instructions stored in the memory 525 and/or storage 530. The CPUs 505 can be a single CPU, multiple CPUs, or a single CPU having multiple processing cores in various embodiments. In some embodiments, a processor 505 can be a digital signal processor (DSP).

The interconnect 520 is used to move data, such as programming instructions, between the CPU 505, I/O device interface 550, storage 530, network interface 515, and memory 525. The interconnect 520 can be implemented using one or more busses. For example, interconnect 520 can be implemented using one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The multi-tenant monitor device 502 can also communicate with one or more external devices, such as, but not limited to, a keyboard, a pointing device, or a display via one or more I/O device interfaces 550. Additionally, the multi-tenant monitor device 502 can communicate with one or more networks such as a local area network (LAN), a general wide area network (WAN), and/or a public network (e.g., the Internet) via network interface 515. As depicted, the network interface 515 communicates with other components of the multi-tenant monitor device 502 via bus 520. In one embodiment, a plurality of nodes of a distributed file system (not shown) is in communication with the multi-tenant monitor device 502 via the I/O interface 550 or via the network interface 515. It should be understood that although not shown, other hardware and/or software components could be used in conjunction with the multi-tenant monitor device 502. Examples include, but are not limited to, microcode, device drivers, redundant processing units, external disk drive arrays, RAID systems, tape drives, and data archival storage systems, etc.

The multi-tenant monitor device 502 also includes a variety of computer system readable media. Such media can be any available media that is accessible by the multi-tenant monitor device 502 and can include both volatile and non-volatile media, removable and non-removable media. Memory 525 is generally included to be representative of a random access memory (e.g., static random access memory (SRAM), dynamic random access memory (DRAM), or Flash). The storage 530 is generally included to be representative of a non-volatile memory, such as, but not limited to, a hard disk drive, solid state device (SSD), removable memory cards, optical storage, or flash memory devices. In an alternative embodiment, the storage 530 can be replaced by storage area-network (SAN) devices, the cloud, or other devices connected to the multi-tenant monitor device 502 via the I/O device interface 550 or via a communication network coupled to the network interface 515.

In some embodiments, the memory 525 stores multi-tenant adaptive monitor instructions 510 and the storage 530 stores historical data 511, correlation coefficients 513, metric weights 508, computed metric frequencies 517, and computed solution 519. However, in various embodiments, the multi-tenant adaptive monitor instructions 510, historical data 511, correlation coefficients 513, metric weights 508, computed metric frequencies 517, and/or computed solution 519 are stored partially in memory 525 and partially in storage 530, or they are stored entirely in memory 525 or entirely in storage 530, or they are accessed over a network via the network interface 515.

The multi-tenant adaptive monitor instructions 510 are executed by the CPU 505. When executed, the multi-tenant adaptive monitor instructions 510 cause the CPU 505 to perform at least part of the functionality described above with respect to FIGS. 2-4. For example, the multi-tenant adaptive monitor instructions 510 cause the CPU 505 to implement one or more aspects of the functionality discussed above with respect to FIGS. 2-4. For example, the CPU 505 can execute the instructions 510 to use stored correlation coefficients 513 to compute metric weights, metric frequencies, and a solution stored as metric weights 508, computed metric frequencies 517, and computed solution 519 in storage device 230. Additionally, the CPU 505 can execute the instructions 510 to use historical data 511 for determining the correlation coefficients 513, in some embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
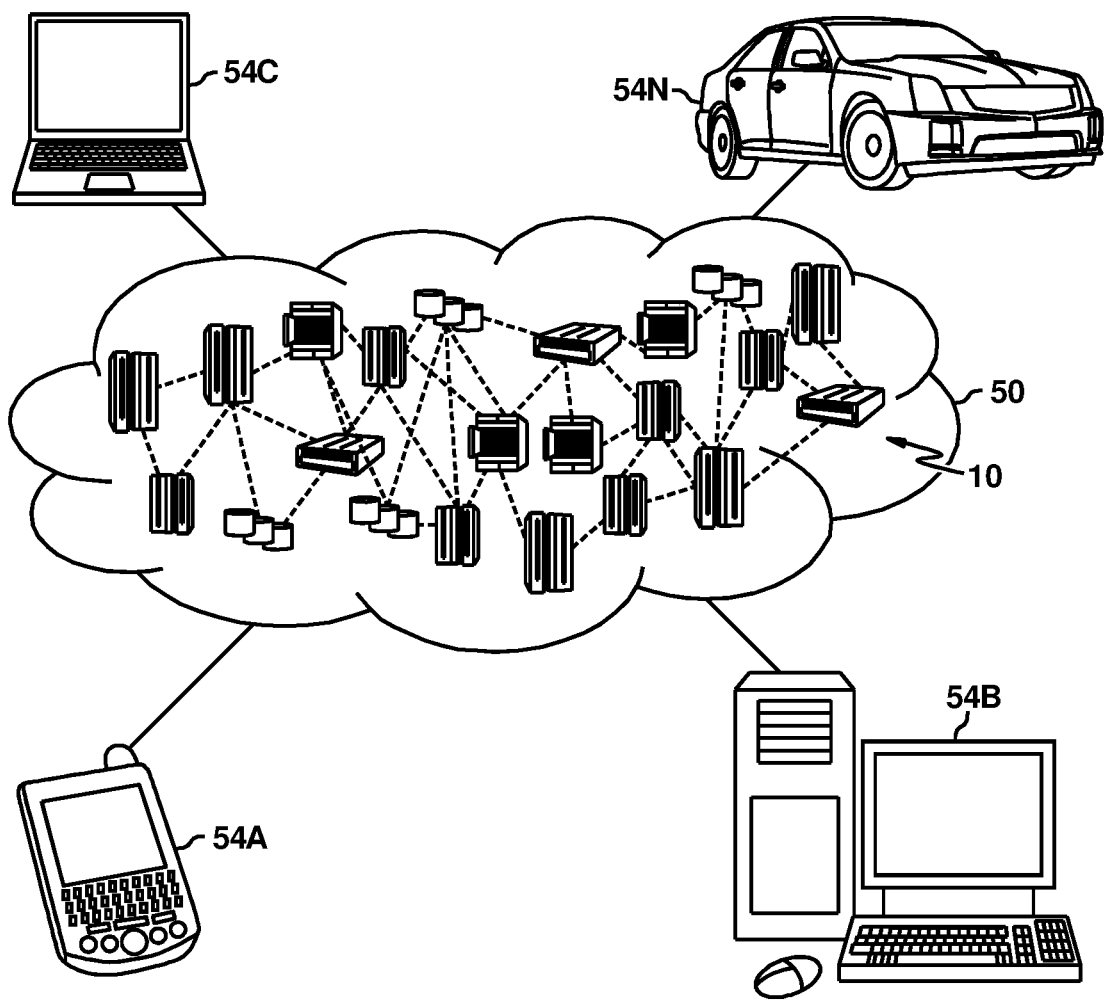
FIG. 6. depicts one embodiment of an example cloud computing environment

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
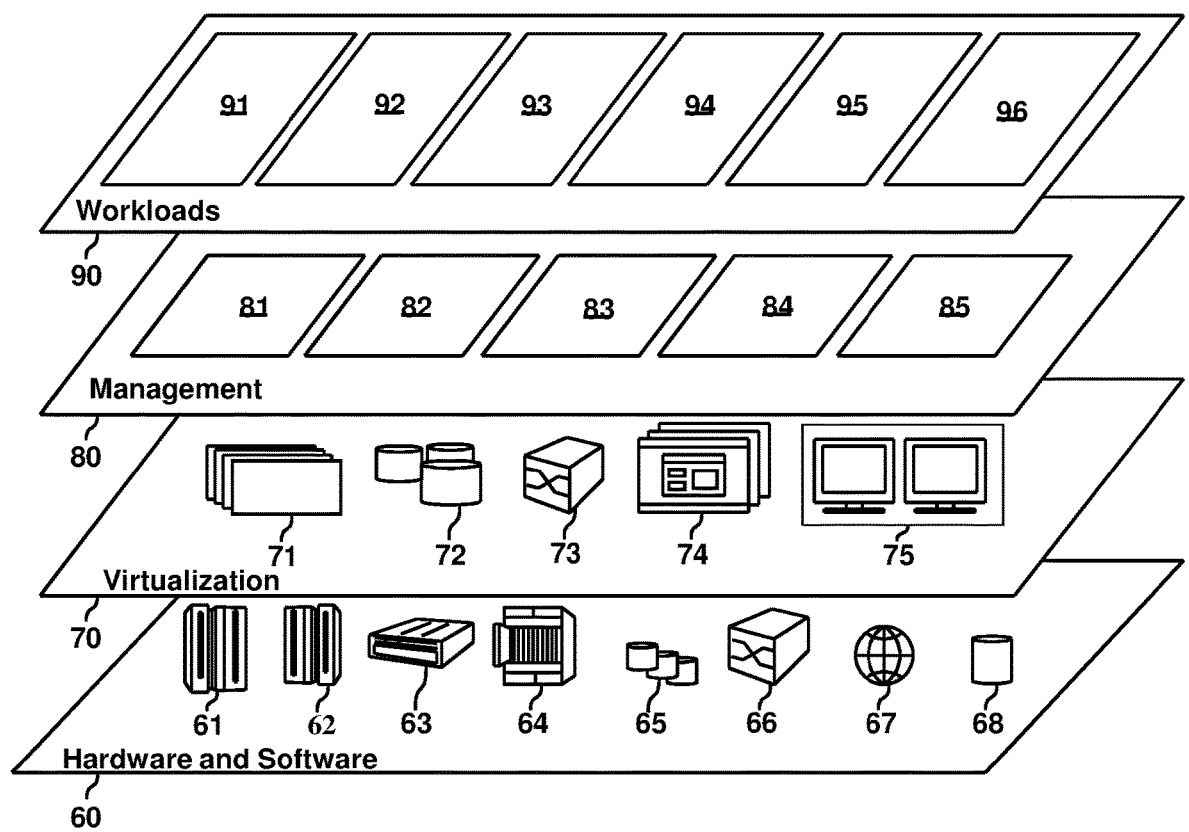
FIG. 7 depicts one embodiment of example abstraction model layers provided by the cloud computing environment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-tenant adaptive monitoring 96. Examples of multi-tenant adaptive monitoring 96 are described in more detail above with respect to method 200-400 in FIGS. 2-4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Example Embodiments

Example 1 includes a computer-implemented method of multi-tenant adaptive monitoring. The method comprises detecting occurrence of a trigger event and modifying, in response to detecting occurrence of the trigger event, a selection of metrics included in a plurality of monitored metrics that are monitored using available resources of a plurality of tenants. Each metric is associated with at least one of the plurality of tenants. The modified selection of metrics includes at least one shared metric associated with at least two or more of the plurality of tenants. The method further comprises assigning a respective monitoring frequency for each metric included in the modified selection of metrics. Assigning the respective monitoring frequency for the at least one shared metric includes computing the respective monitoring frequency as a function of a respective desired monitoring frequency for each of the two more tenants associated with the at least one shared metric. The method further comprises computing respective weights for each metric in the modified selection of metrics; performing a feasibility check to find a solution to a mathematical model for monitoring the modified selection of metrics at the respective assigned monitoring frequency for each metric using the available resources of the plurality of tenants; and, in response to determining that a solution to the mathematical model cannot be found, adjusting the respective monitoring frequency for one or more metrics in the modified selection of metrics based, at least in part, on the respective weight for each metric and on the at least one tenant associated with each metric until a solution to the mathematical model is found. The method further comprises, in response to finding a first solution to the mathematical model, allocating processing associated with monitoring each metric in the modified selection of metrics among the available resources of the plurality of tenants based on the respective monitoring frequency of each metric and based on the at least one tenant associated with each metric.

Example 2 includes the computer-implemented method of example 1, wherein the detected trigger event is one of an environment-based event or a metric-based event.

Example 3 includes the computer-implemented method of example 1, wherein the detected trigger event is a tenant-preference-based event; and wherein detecting occurrence of the tenant-preference-based event includes predicting a change in a tenant preference based on an analysis of historical data.

Example 4 includes the computer-implemented method of any of examples 1-3, wherein allocating processing associated with monitoring each metric in the modified selection of metrics further comprises proportionally distributing processing associated with monitoring each respective metric in the modified selection of metrics amongst the available resources of the plurality of tenants according to a respective minimum frequency for monitoring the respective metric desired by each respective tenant requesting the respective metric.

Example 5 includes the computer-implemented method of any of examples 1-4, wherein adjusting the respective monitoring frequency for one or more metrics in the modified selection of metrics includes initializing a first set of metrics, a second set of metrics, and a set of unused resources; wherein the first set of metrics and the second set of metrics are initialized as empty and the set of unused resources is initialized to include all the available resources of the plurality of tenants; ranking the metrics in the modified selection of metrics in a descending order based on the respective weight of each metric in the modified selection of metrics; iteratively performing a respective feasibility check for each respective metric in the modified selection of metrics beginning with a highest ranked metric, wherein each respective feasibility check is based on each respective metric and on metrics in the first set of metrics; for each respective metric for which the respective feasibility check indicates a solution exists for monitoring the respective metric and the metrics in the first set of metrics at the respective computed monitoring frequency for each metric using the available resources of the plurality of tenants, updating the first set of metrics to include the respective metric and updating the set of unused resources to remove resources needed for monitoring the respective metric; for each respective metric for which the respective feasibility check cannot find a solution, updating the second set of metrics to include the respective metric; and for each respective tenant associated with at least one metric in the second set of metrics, reducing the respective monitoring frequency of all metrics associated with the respective tenant.

Example 6 includes the computer-implemented method of any of examples 1-5, wherein allocating processing associated with monitoring each metric in the modified selection of metrics includes ranking the metrics in the modified selection of metrics in a descending order based on the respective weight of each metric in the modified selection of metrics; incrementally increasing the respective monitoring frequency of each metric in the modified selection of metrics to utilize unused resources of the plurality of tenants; wherein the respective monitoring frequency of each metric in the modified selection of metrics is incrementally increased one metric at a time, beginning with the highest ranked metric, until a respective feasibility check performed after the incremental increase of the respective monitoring frequency of each metric indicates that a solution cannot be found for monitoring the metrics in the modified selection of metrics at the respective increased monitoring frequency for the respective metric using the available resources of the plurality of tenants.

Example 7 includes the computer-implemented method of any of examples 1-6, wherein the modified selection of metrics includes at least one unshared metric that is associated with a single tenant of the plurality of tenants, wherein the processing associated with monitoring the at least one unshared metric is allocated only to the respective available resources of the single tenant associated with the unshared metric.

Example 8 includes a computer program product comprising a computer readable storage medium having a computer readable program stored therein. The computer readable program, when executed by a processor, causes the processor to detect occurrence of a trigger event; and modify, in response to detecting occurrence of the trigger event, a selection of metrics included in a plurality of monitored metrics that are monitored using available resources of a plurality of tenants, each metric associated with at least one of the plurality of tenants. The modified selection of metrics includes at least one shared metric associated with at least two or more of the plurality of tenants. The computer readable program is further configured to cause the processor to assign a respective monitoring frequency for each metric included in the modified selection of metrics. Assigning the respective monitoring frequency for the at least one shared metric includes computing the respective monitoring frequency as a function of a respective desired monitoring frequency for each of the two more tenants associated with the at least one shared metric. The computer readable program is further configured to cause the processor to compute respective weights for each metric in the modified selection of metrics; perform a feasibility check to find a solution to a mathematical model for monitoring the modified selection of metrics at the respective computed monitoring frequency for each metric using the available resources of the plurality of tenants; and, in response to determining that a solution to the mathematical model cannot be found, adjust the respective monitoring frequency for one or more metrics in the modified selection of metrics based, at least in part, on the respective weight for each metric and on the at least one tenant associated with each metric until a solution to the mathematical model is found. The computer readable program is further configured to cause the processor to, in response to find a first solution to the mathematical model, allocate processing associated with monitoring each metric in the modified selection of metrics among the available resources of the plurality of tenants based on the respective monitoring frequency of each metric and based on the at least one tenant associated with each metric.

Example 9 includes the computer program product of example 8, wherein the detected trigger event is one of an environment-based event or a metric-based event.

Example 10 includes the computer program product of example 8, wherein the detected trigger event is a tenant-preference-based event; and wherein detecting occurrence of the tenant-preference-based event includes one of: predicting a change in a tenant preference based on an analysis of historical data; or receiving an explicit request for a change in the tenant preference from a plurality of tenant devices associated with at least one tenant.

Example 11 includes the computer program product of any of examples 8-10, wherein the modified selection of metrics includes at least one unshared metric that is associated with a single tenant of the plurality of tenants, wherein the computer readable program is further configured to cause the processor to allocate processing associated with monitoring the at least one unshared metric only to the respective available resources of the single tenant associated with the unshared metric.

Example 12 includes the computer program product of any of examples 8-11, wherein the computer readable program is further configured to cause the processor to adjust the respective monitoring frequency for one or more metrics in the modified selection of metrics by initializing a first set of metrics, a second set of metrics, and a set of unused resources; wherein the first set of metrics and the second set of metrics are initialized as empty and the set of unused resources is initialized to include all the available resources of the plurality of tenants; ranking the metrics in the modified selection of metrics in a descending order based on the respective weight of each metric in the modified selection of metrics; iteratively performing a respective feasibility check for each respective metric in the modified selection of metrics beginning with a highest ranked metric, wherein each respective feasibility check is based on each respective metric and on metrics in the first set of metrics; for each respective metric for which the respective feasibility check indicates a solution exists for monitoring the respective metric and the metrics in the first set of metrics at the respective computed monitoring frequency for each metric using the available resources of the plurality of tenants, updating the first set of metrics to include the respective metric and updating the set of unused resources to remove resources needed for monitoring the respective metric; for each respective metric for which the respective feasibility check cannot find a solution, updating the second set of metrics to include the respective metric; and for each respective tenant associated with at least one metric in the second set of metrics, reducing the respective monitoring frequency of all metrics associated with the respective tenant.

Example 13 includes the computer program product of any of examples 8-12, wherein the computer readable program is further configured to cause the processor to allocate processing associated with monitoring each metric in the modified selection of metrics by incrementally increasing the respective monitoring frequency of each metric in the modified selection of metrics, one metric at a time in an order based on the respective weight for each metric, until it is determined that the respective resources of the plurality of tenants cannot accommodate another incremental monitoring frequency increase.

Example 14 includes the computer program product of any of examples 8-13, wherein the computer readable program is further configured to cause the processor to allocate processing associated with monitoring each metric in the modified selection of metrics by proportionally distributing processing associated with monitoring each respective metric in the modified selection of metrics amongst the available resources of the plurality of tenants according to a respective minimum frequency for monitoring the respective metric desired by each respective tenant requesting the respective metric.

Example 15 includes a multi-tenant monitor device. The multi-tenant monitor device comprises an interface configured to communicatively couple the multi-tenant monitor device to a plurality of tenant devices, wherein each of the plurality of tenant devices is associated with at least one tenant; and a processor communicatively coupled to the interface. The processor is configured to detect occurrence of a trigger event; and modify, in response to detecting occurrence of the trigger event, a selection of metrics included in a plurality of monitored metrics that are monitored using available resources of a plurality of tenants, each metric associated with at least one of the plurality of tenants. The modified selection of metrics includes at least one shared metric associated with at least two or more of the plurality of tenants. The processor is further configured to assign a respective monitoring frequency for each metric included in the modified selection of metrics. Assigning the respective monitoring frequency for the at least one shared metric includes computing the respective monitoring frequency as a function of a respective desired monitoring frequency for each of the two more tenants associated with the at least one shared metric. The processor is further configured to compute respective weights for each metric in the modified selection of metrics; perform a feasibility check to find a solution to a mathematical model for monitoring the modified selection of metrics at the respective computed monitoring frequency for each metric using the available resources of the plurality of tenants; and, in response to determining that a solution to the mathematical model cannot be found, adjust the respective monitoring frequency for one or more metrics in the modified selection of metrics based, at least in part, on the respective weight for each metric and on the at least one tenant associated with each metric until a solution to the mathematical model is found. The processor is further configured to, in response to find a first solution to the mathematical model, allocate processing associated with monitoring each metric in the modified selection of metrics among the available resources of the plurality of tenants based on the respective monitoring frequency of each metric and based on the at least one tenant associated with each metric.

Example 16 includes the multi-tenant monitor device of example 15, wherein the detected trigger event is a tenant-preference-based event; and wherein to detect occurrence of the tenant-preference-based event the processor is further configured to predict a change in a tenant preference based on an analysis of historical data; or receive an explicit request for a change in the tenant preference from a plurality of tenant devices associated with at least one tenant.

Example 17 includes the multi-tenant monitor device of any of examples 15-16, wherein the modified selection of metrics includes at least one unshared metric that is associated with a single tenant of the plurality of tenants, wherein the processor is configured to allocate processing associated with monitoring the at least one unshared metric only to the respective available resources of the single tenant associated with the unshared metric.

Example 18 includes the multi-tenant monitor device of any of examples 15-17, wherein the processor is further configured to adjust the respective monitoring frequency for one or more metrics in the modified selection of metrics by initializing a first set of metrics, a second set of metrics, and a set of unused resources; wherein the first set of metrics and the second set of metrics are initialized as empty and the set of unused resources is initialized to include all the available resources of the plurality of tenants; ranking the metrics in the modified selection of metrics in a descending order based on the respective weight of each metric in the modified selection of metrics; iteratively performing a respective feasibility check for each respective metric in the modified selection of metrics beginning with a highest ranked metric, wherein each respective feasibility check is based on each respective metric and on metrics in the first set of metrics; for each respective metric for which the respective feasibility check indicates a solution exists for monitoring the respective metric and the metrics in the first set of metrics at the respective computed monitoring frequency for each metric using the available resources of the plurality of tenants, updating the first set of metrics to include the respective metric and updating the set of unused resources to remove resources needed for monitoring the respective metric; for each respective metric for which the respective feasibility check cannot find a solution, updating the second set of metrics to include the respective metric; and for each respective tenant associated with at least one metric in the second set of metrics, reducing the respective monitoring frequency of all metrics associated with the respective tenant.

Example 19 includes the multi-tenant monitor device of any of examples 15-18, wherein the processor is configured to allocate processing associated with monitoring each metric in the modified selection of metrics by ranking the metrics in the modified selection of metrics in a descending order based on the respective weight of each metric in the modified selection of metrics and incrementally increasing the respective monitoring frequency of each metric in the modified selection of metrics one metric at a time, beginning with the highest ranked metric, until a respective feasibility check performed after the incremental increase of the respective monitoring frequency of each metric indicates that a solution cannot be found for monitoring the metrics in the modified selection of metrics at the respective increased monitoring frequency for the respective metric using the available resources of the plurality of tenants.

Example 20 includes the multi-tenant monitor device of any of examples 15-19, wherein the processor is configured to allocate processing associated with monitoring each metric in the modified selection of metrics by proportionally distributing processing associated with monitoring each respective metric in the modified selection of metrics amongst the available resources of the plurality of tenants according to a respective minimum frequency for monitoring the respective metric desired by each respective tenant requesting the respective metric.

It will be appreciated that, although specific embodiments have been described herein for purposes of illustration, various modifications may be made without departing from the spirit and scope of the embodiments. In particular, a sensor can be monitored remotely by any device connected to the cloud computing network. Additionally, resource constraints are not limited to the device actually performing the monitoring. Accordingly, the scope of protection of these embodiments is limited only by the following claims and their equivalents.

What is claimed is:

1. A computer-implemented method of multi-tenant adaptive monitoring, the method comprising:
    detecting occurrence of a trigger event;
    modifying, in response to detecting occurrence of the trigger event, a selection of metrics included in a plurality of monitored metrics that are monitored using available resources of a plurality of tenants, each metric associated with at least one of the plurality of tenants;
    assigning a respective monitoring frequency for each metric included in the modified selection of metrics;
    computing respective weights for each metric in the modified selection of metrics;
    performing a check to determine if the available resources of the plurality of tenants can achieve the monitoring of the modified selection of metrics at the respective assigned monitoring frequency for each metric included in the modified selection of metrics;
    in response to determining that the available resources of the plurality of tenants can not achieve the monitoring of the modified selection of metrics at the respective assigned monitoring frequency, adjusting the respective monitoring frequency for one or more metrics in the modified selection of metrics based, at least in part, on the respective weight for each metric and on the at least one tenant associated with each metric until it is determined that the available resources of the plurality of tenants is able to achieve the monitoring for each metric included in the modified selection of metrics at the respective adjusted monitoring frequency; and
    in response to determining that the available resources of the plurality of tenants can achieve the monitoring of the modified selection of metrics, allocating processing associated with monitoring each metric in the modified selection of metrics among the available resources of the plurality of tenants based on the respective monitoring frequency of each metric and based on the at least one tenant associated with each metric.

2. The computer-implemented method of claim 1, wherein the detected trigger event is one of an environment-based event or a metric-based event.

3. The computer-implemented method of claim 1, wherein the detected trigger event is a tenant-preference-based event; and
    wherein detecting occurrence of the tenant-preference-based event includes predicting a change in a tenant preference based on an analysis of historical data.

4. The computer-implemented method of claim 1, wherein allocating processing associated with monitoring each metric in the modified selection of metrics further comprises proportionally distributing processing associated with monitoring each respective metric in the modified selection of metrics amongst the available resources of the plurality of tenants according to a respective minimum frequency for monitoring the respective metric desired by each respective tenant requesting the respective metric.

5. The computer-implemented method of claim 1, wherein the modified selection of metrics includes at least one shared metric associated with at least two or more of the plurality of tenants; and
    wherein assigning the respective monitoring frequency for the at least one shared metric includes computing the respective monitoring frequency as a function of a respective desired monitoring frequency for each of the two more tenants associated with the at least one shared metric.

6. The computer-implemented method of claim 1, wherein allocating processing associated with monitoring each metric in the modified selection of metrics includes:
    ranking the metrics in the modified selection of metrics in a descending order based on the respective weight of each metric in the modified selection of metrics;
    incrementally increasing the respective monitoring frequency of each metric in the modified selection of metrics to utilize unused resources of the plurality of tenants;
    wherein the respective monitoring frequency of each metric in the modified selection of metrics is incrementally increased one metric at a time, beginning with the highest ranked metric, until a respective feasibility check performed after the incremental increase of the respective monitoring frequency of each metric indicates that a solution cannot be found for monitoring the metrics in the modified selection of metrics at the respective increased monitoring frequency for the respective metric using the available resources of the plurality of tenants.

7. The computer-implemented method of claim 1, wherein the modified selection of metrics includes at least one unshared metric that is associated with a single tenant of the plurality of tenants, wherein the processing associated with monitoring the at least one unshared metric is allocated only to the respective available resources of the single tenant associated with the unshared metric.

8. A computer program product comprising a computer readable storage medium having a computer readable program stored therein, wherein the computer readable program, when executed by a processor, causes the processor to:
    detect occurrence of a trigger event;
    modify, in response to detecting occurrence of the trigger event, a selection of metrics included in a plurality of monitored metrics that are monitored using available resources of a plurality of tenants, each metric associated with at least one of the plurality of tenants;
    assign a respective monitoring frequency for each metric included in the modified selection of metrics;
    compute respective weights for each metric in the modified selection of metrics;
    perform a check to determine if the available resources of the plurality of tenants can achieve the monitoring of the modified selection of metrics at the respective assigned monitoring frequency for each metric included in the modified selection of metrics;

in response to determining that the available resources of the plurality of tenants cannot achieve the monitoring of the modified selection of metrics at the respective assigned monitoring frequency, adjust the respective monitoring frequency for one or more metrics in the modified selection of metrics based, at least in part, on the respective weight for each metric and on the at least one tenant associated with each metric until it is determined that the available resources of the plurality of tenants is able to achieve the monitoring for each metric included in the modified selection of metrics at the respective adjusted monitoring frequency; and in response to determining that the available resources of the plurality of tenants can achieve the monitoring of the modified selection of metrics, allocate processing associated with monitoring each metric in the modified selection of metrics among the available resources of the plurality of tenants based on the respective monitoring frequency of each metric and based on the at least one tenant associated with each metric.

9. The computer program product of claim 8, wherein the detected trigger event is one of an environment-based event or a metric-based event.

10. The computer program product of claim 8, wherein the detected trigger event is a tenant-preference-based event; and wherein detecting occurrence of the tenant-preference-based event includes one of:

predicting a change in a tenant preference based on an analysis of historical data; or receiving an explicit request for a change in the tenant preference from a plurality of tenant devices associated with at least one tenant.

11. The computer program product of claim 8, wherein the modified selection of metrics includes at least one unshared metric that is associated with a single tenant of the plurality of tenants, wherein the computer readable program is further configured to cause the processor to allocate processing associated with monitoring the at least one unshared metric only to the respective available resources of the single tenant associated with the unshared metric.

12. The computer program product of claim 8, wherein the computer readable program is further configured to cause the processor to adjust the respective monitoring frequency for one or more metrics in the modified selection of metrics by:

initializing a first set of metrics, a second set of metrics, and a set of unused resources; wherein the first set of metrics and the second set of metrics are initialized as empty and the set of unused resources is initialized to include all the available resources of the plurality of tenants;

ranking the metrics in the modified selection of metrics in a descending order based on the respective weight of each metric in the modified selection of metrics;

iteratively performing a respective feasibility check for each respective metric in the modified selection of metrics beginning with a highest ranked metric, wherein each respective feasibility check is based on each respective metric and on metrics in the first set of metrics;

for each respective metric for which the respective feasibility check indicates a solution exists for monitoring the respective metric and the metrics in the first set of metrics at the respective computed monitoring frequency for each metric using the available resources of the plurality of tenants, updating the first set of metrics to include the respective metric and updating the set of unused resources to remove resources needed for monitoring the respective metric;

for each respective metric for which the respective feasibility check cannot find a solution, updating the second set of metrics to include the respective metric; and for each respective tenant associated with at least one metric in the second set of metrics, reducing the respective monitoring frequency of all metrics associated with the respective tenant.

13. The computer program product of claim 8, wherein the modified selection of metrics includes at least one shared metric associated with at least two or more of the plurality of tenants; and wherein the computer readable program is further configured to cause the processor to assign the respective monitoring frequency for the at least one shared metric by computing the respective monitoring frequency as a function of a respective desired monitoring frequency for each of the two more tenants associated with the at least one shared metric.

14. The computer program product of claim 8, wherein the computer readable program is further configured to cause the processor to allocate processing associated with monitoring each metric in the modified selection of metrics by proportionally distributing processing associated with monitoring each respective metric in the modified selection of metrics amongst the available resources of the plurality of tenants according to a respective minimum frequency for monitoring the respective metric desired by each respective tenant requesting the respective metric.

15. A multi-tenant monitor device comprising:

an interface configured to communicatively couple the multi-tenant monitor device to a plurality of tenant devices, wherein each of the plurality of tenant devices is associated with at least one tenant;

a processor communicatively coupled to the interface and configured to:

detect occurrence of a trigger event;

modify, in response to detecting occurrence of the trigger event, a selection of metrics included in a plurality of monitored metrics that are monitored using available resources of a plurality of tenants, each metric associated with at least one of the plurality of tenants;

assign a respective monitoring frequency for each metric included in the modified selection of metrics;

compute respective weights for each metric in the modified selection of metrics;

perform a check to determine if the available resources of the plurality of tenants can achieve the monitoring of the modified selection of metrics at the respective assigned monitoring frequency for each metric included in the modified selection of metrics;

in response to determining that the available resources of the plurality of tenants cannot achieve the monitoring of the modified selection of metrics at the respective assigned monitoring frequency, adjust the respective monitoring frequency for one or more metrics in the modified selection of metrics based, at least in part, on the respective weight for each metric and on the at least one tenant associated with each metric until it is determined that the available resources of the plurality of tenants is able to achieve the monitoring for each metric included in the modified selection of metrics at the respective adjusted monitoring frequency; and in response to determining that the available resources of the plurality of tenants can achieve the monitoring of the modified selection of metrics, allocate processing associated with monitoring each metric in the modified selection of metrics among the available resources of the plurality of tenants based on the respective monitoring frequency of each metric and based on the at least one tenant associated with each metric.

16. The multi-tenant monitor device of claim 15, wherein the detected trigger event is a tenant-preference-based event; and wherein to detect occurrence of the tenant-preference-based event the processor is further configured to:

predict a change in a tenant preference based on an analysis of historical data; or receive an explicit request for a change in the tenant preference from a plurality of tenant devices associated with at least one tenant.

17. The multi-tenant monitor device of claim 15, wherein the modified selection of metrics includes at least one unshared metric that is associated with a single tenant of the plurality of tenants, wherein the processor is configured to allocate processing associated with monitoring the at least one unshared metric only to the respective available resources of the single tenant associated with the unshared metric.

18. The multi-tenant monitor device of claim 15, wherein the modified selection of metrics includes at least one shared metric associated with at least two or more of the plurality of tenants; and wherein the computer readable program is further configured to cause the processor to assign the respective monitoring frequency for the at least one shared metric by computing the respective monitoring frequency as a function of a respective desired monitoring frequency for each of the two more tenants associated with the at least one shared metric.

19. The multi-tenant monitor device of claim 15, wherein the processor is configured to allocate processing associated with monitoring each metric in the modified selection of metrics by:

ranking the metrics in the modified selection of metrics in a descending order based on the respective weight of each metric in the modified selection of metrics;

incrementally increasing the respective monitoring frequency of each metric in the modified selection of metrics one metric at a time, beginning with the highest ranked metric, until a respective feasibility check performed after the incremental increase of the respective monitoring frequency of each metric indicates that a solution cannot be found for monitoring the metrics in the modified selection of metrics at the respective increased monitoring frequency for the respective metric using the available resources of the plurality of tenants.

20. The multi-tenant monitor device of claim 15, wherein the processor is configured to allocate processing associated with monitoring each metric in the modified selection of metrics by proportionally distributing processing associated with monitoring each respective metric in the modified selection of metrics amongst the available resources of the plurality of tenants according to a respective minimum frequency for monitoring the respective metric desired by each respective tenant requesting the respective metric.

* * * * *